US009401093B2

(12) United States Patent
Gillet et al.

(10) Patent No.: US 9,401,093 B2
(45) Date of Patent: Jul. 26, 2016

(54) PROCEDURE FOR THE DETECTION AND DISPLAY OF ARTIFICIAL OBSTACLES FOR A ROTARY-WING AIRCRAFT

(71) Applicant: AIRBUS HELICOPTERS, Marignane (FR)

(72) Inventors: Marianne Gillet, Vitrolles (FR); Francois-Xavier Filias, Pelissanne (FR); Richard Pire, Istres (FR)

(73) Assignee: Airbus Helicopters, Marignane (FR)

(*) Notice: Subject to any disclaimer, the term of this patent is extended or adjusted under 35 U.S.C. 154(b) by 0 days.

(21) Appl. No.: 14/672,604

(22) Filed: Mar. 30, 2015

(65) Prior Publication Data

US 2015/0279219 A1 Oct. 1, 2015

(30) Foreign Application Priority Data

Mar. 28, 2014 (FR) ...................................... 14 00762

(51) Int. Cl.
*G08G 1/16* (2006.01)
*G08G 5/04* (2006.01)
(Continued)

(52) U.S. Cl.
CPC . *G08G 5/04* (2013.01); *G01S 13/93* (2013.01); *G01S 17/933* (2013.01); *G06K 9/00805* (2013.01); *G08G 5/0021* (2013.01); *G01S 13/89* (2013.01); *G01S 17/89* (2013.01);
(Continued)

(58) Field of Classification Search
CPC combination set(s) only.
See application file for complete search history.

(56) References Cited

U.S. PATENT DOCUMENTS 3,750,166 A * 7/1973 Dearth .................. G01S 5/0009
                                                   342/182
5,415,549 A * 5/1995 Logg ...................... A63F 13/005
                                                   345/589
(Continued)

FOREIGN PATENT DOCUMENTS

| FR | 2888944 | 1/2007 |
| FR | 2953300 | 6/2011 |
| FR | 2953316 | 6/2011 |

OTHER PUBLICATIONS

French Search Report for FR 1400762, Completed by the French Patent Office on Feb. 6, 2015, 12 Pages.

(Continued)

*Primary Examiner* — Jonathan L Sample
(74) *Attorney, Agent, or Firm* — Brooks Kushman P.C.

(57) ABSTRACT

A procedure for the detection and display of the ground and of obstacles through the use of detection means installed onboard a vehicle, which detection means send measurement signals toward the ground and receive a plurality of elementary plots (Pe). The procedure makes it possible to create a grid of the ground along a horizontal plane, with each ground cell (Ms(i,j)) consisting of an elementary plot (Pe) having a minimum altitude Zmin(i,j)), and with each other elementary plot (Pe) corresponding to the ground cell (Ms(i,j)) and having a different altitude ($Z_n(i,j)$), thereby forming an obstacle plot ($Po_n(i,j)$). Each newly received elementary plot (Pe) is then compared against the corresponding ground cell (Ms(i, j)) and processed according to its altitude ($Z_n(i,j)$). The ground cells (Ms(i,j)) and/or the obstacle plots ($Po_n(i,j)$) are displayed on display means in order to indicate to the pilot of the vehicle the potential obstacles other than the ground.

12 Claims, 1 Drawing Sheet

(51) Int. Cl.
*G01S 17/93* (2006.01)
*G01S 13/93* (2006.01)
*G06K 9/00* (2006.01)
*G08G 5/00* (2006.01)
*G01S 17/89* (2006.01)
*G01S 13/89* (2006.01)

(52) U.S. Cl.
CPC .......... G06T2207/10028 (2013.01); G06T 2207/30261 (2013.01)

(56) References Cited

U.S. PATENT DOCUMENTS

| | | | |
|---|---|---|---|
| 5,867,804 A * | 2/1999 | Pilley | G01C 23/00 340/961 |
| 5,949,375 A * | 9/1999 | Ishiguro | G01S 19/40 342/457 |
| 6,006,158 A * | 12/1999 | Pilley | G01C 23/00 340/953 |
| 6,049,756 A * | 4/2000 | Libby | G06T 19/003 318/587 |
| 6,195,609 B1 * | 2/2001 | Pilley | G01C 23/00 342/36 |
| 6,201,544 B1 * | 3/2001 | Ezaki | G01C 21/3638 345/419 |
| 6,748,325 B1 * | 6/2004 | Fujisaki | G01C 21/00 701/301 |
| 6,920,392 B2 * | 7/2005 | Adachi | G09B 29/106 340/995.12 |
| 6,922,157 B2 * | 7/2005 | Kimura | G06T 17/05 340/990 |
| 6,999,079 B2 * | 2/2006 | Kida | G06F 17/30241 345/419 |
| 7,046,841 B1 | 5/2006 | Dow et al. | |
| 7,336,274 B2 * | 2/2008 | Kida | G06F 17/30241 345/419 |
| 7,397,548 B2 | 7/2008 | Filias et al. | |
| 8,527,237 B2 | 9/2013 | Pire et al. | |
| 8,565,958 B1 | 10/2013 | Montemerlo et al. | |
| 8,577,608 B2 | 11/2013 | Gillet et al. | |
| 8,665,260 B2 * | 3/2014 | McCrae | G06T 15/30 345/419 |
| 8,903,645 B2 * | 12/2014 | Asai | G01C 21/20 345/419 |
| 9,055,277 B2 * | 6/2015 | Katayama | H04N 13/0022 |
| 2002/0070981 A1 * | 6/2002 | Kida | G06F 17/30241 715/833 |
| 2002/0075259 A1 * | 6/2002 | Sakamoto | G01C 21/3638 345/419 |
| 2003/0109984 A1 * | 6/2003 | Adachi | G09B 29/106 701/446 |
| 2004/0125989 A1 * | 7/2004 | Kimura | G06T 17/05 382/113 |
| 2005/0086227 A1 * | 4/2005 | Sullivan | G06T 17/05 |
| 2006/0087507 A1 * | 4/2006 | Urano | G06T 19/00 345/421 |
| 2006/0092155 A1 * | 5/2006 | Kida | G06F 17/30241 345/419 |
| 2007/0200845 A1 * | 8/2007 | Kumagai | G06T 17/05 345/419 |
| 2007/0276709 A1 * | 11/2007 | Trimby | A63F 13/00 705/6 |
| 2010/0118025 A1 * | 5/2010 | Smith | G06Q 30/02 345/418 |
| 2011/0144942 A1 | 6/2011 | Pire et al. | |
| 2011/0282581 A1 | 11/2011 | Zeng | |
| 2012/0123628 A1 * | 5/2012 | Duggan | G05D 1/0061 701/24 |
| 2012/0274625 A1 * | 11/2012 | Lynch | G06T 17/05 345/419 |
| 2013/0004179 A1 * | 1/2013 | Nielsen | H04B 3/50 398/115 |
| 2013/0022197 A1 | 1/2013 | Yamamoto et al. | |
| 2013/0202197 A1 | 8/2013 | Reeler et al. | |
| 2013/0257852 A1 | 10/2013 | Meeker et al. | |
| 2014/0078146 A1 * | 3/2014 | Kamiya | G01C 11/06 345/427 |
| 2014/0282783 A1 * | 9/2014 | Totten | H04L 12/2885 725/111 |
| 2015/0032298 A1 * | 1/2015 | Pepitone | B64D 43/00 701/4 |
| 2015/0187120 A1 * | 7/2015 | Overbeck | G06T 19/20 345/427 |
| 2015/0304634 A1 * | 10/2015 | Karvounis | H04N 13/0239 348/46 |

OTHER PUBLICATIONS

Wiesemann et al. Aerospace Science and Technology 2005, vol. 9, p. 517-524, "Multi-resolution terrain depiction on an embedded 2D/3D synthetic vision system."

Triebel et al. Proceedings on the 2006 IEEE/RSJ International Conference on Intelligent Robots and Systems Oct. 9-15, 2006, p. 2276-2282, "Multi-Level Surface Maps for Outdoor Terrain Mapping and Loop Closing."

Axelsson., ISPRS Journal of Photogrammetry and Remote Sensing 1999, vol. 54, p. 138-147, "Processing of laser scanner data—algorithms and applications."

* cited by examiner

PROCEDURE FOR THE DETECTION AND DISPLAY OF ARTIFICIAL OBSTACLES FOR A ROTARY-WING AIRCRAFT

CROSS REFERENCE TO RELATED APPLICATION

This application claims priority to French patent application No. FR 14 00762 filed on Mar. 28, 2014, the disclosure of which is incorporated in its entirety by reference herein.

BACKGROUND OF THE INVENTION (1) Field of the Invention

The present invention relates to a procedure for the detection and display of the ground and of artificial obstacles present in the field of detection, of detection means installed on board a vehicle, and particularly on board a rotary-wing aircraft.

(2) Description of Related Art

Such a procedure is preferably, but non-limitatively, implemented in conjunction with detection means, such as a LIDAR detector, whose acronym corresponds to the English phrase "Light Detection and Ranging", or a RADAR detector, whose acronym corresponds to the English phrase "Radio Detection and Ranging". Such detection means may also consist of a stereoscopic or three-dimensional imaging system.

In order to allow the detection and display of the ground, the terrain, and artificial obstacles such as a tower, a pylon, or an electrical power line, such a procedure must be sufficiently reliable and rapid. In particular, it must process the detected data as rapidly as possible, in order to be able to deliver in real-time, to a human or automatic driver or pilot of the vehicle, the information that will make it possible to identify and avoid such obstacles.

More specifically, such reliable and rapid information for the detection of the ground and of obstacles is necessary, or even essential, for the pilot of an aircraft flying close to the ground under impaired visibility conditions, in order to allow the obstacles to be overflown and avoided.

It is known that detection means that provide elementary echoes or plots based on the environment can be used to produce a database of the elevation of the terrain of the area observed by the detection means. This database includes the terrain and the obstacles. However, in its raw state this database also includes errors due to false echoes, which must be taken into consideration in order to be eliminated or corrected.

In particular, it is known that document FR 2888944 describes a procedure for the detection of the presence of at least one wireframe object suspended in the field of detection of a telemetry device, with the calculation of the ground coordinates of plots corresponding to the echoes delivered by the telemetry device. Candidate plots are selected from among these plots, and line segments in proximity to vertical projections of the candidate plots are determined. Last, a Hough transform is used to detect, in each vertical plane containing one of these line segments, portions of small chains near which the candidate plots are located. However, the use of such a Hough transform does not lead to optimal processing time.

Document FR 2953300 also describes a procedure for the detection of the presence of at least one suspended wireframe object, using the least-squares method, which makes it possible to reduce the calculation time.

Document FR 2953316 is also known, which describes a procedure for the detection of the terrain and of obstacles, which procedure makes it possible to eliminate detection errors caused by false echoes. In particular, a false echo is identified when an isolated plot is detected.

Furthermore, document U.S. Pat. No. 7,046,841 describes a method and a system for the analysis and detection of the environment by means of three-dimensional laser detection. This three-dimensional information is broken down into finite elements, with an eigenvalue and an eigenvector being associated with each finite element depending on the characteristics of the detected element, such as terrain, vegetation, a building, or an electrical power line. Thus, each external element can be identified.

Last, document US 2013/0257852 describes a synthetic vision system for the environment of a vehicle distinguishing, in particular, objects that are attached to the ground and objects that are detached from the ground. This system includes a database for the ground and for the obstacles attached to and detached from the ground; detection means, such as LIDAR detection means; calculation means; and display means. Thus, detected terrain surfaces are displayed based on information in the database, with the incorporation of the objects attached to the ground, as well as the obstacles corresponding to objects that are detached from the ground.

Furthermore, the technological background of the technical field of the invention includes several documents, including document US 2011/0282581, document US 2013/022197, and document U.S. Pat. No. 8,565,958. This technological background also includes the following publications: "Multi-resolution terrain depiction on an embedded 2D/3D synthetic vision system", by Thomas Wiesemann, in *Aerospace Science and Technology* (Elsevier, September 2005); "Multi-level surface maps for outdoor terrain mapping and loop closing", by Rudolph Triebel, presented at the IEEE International Conference on Intelligent Robots and Systems (October 2006); and "Processing of laser scanner data—algorithms and applications", by Peter Axelsson, in *Photogrammetry and Remote Sensing* (Elsevier, July 1999).

Nevertheless, such systems based on detection means, image processing, and shape recognition employ substantial calculation resources and require significant amounts of calculation time. In particular, the recognition of the detected shapes and the detailed display of those shapes are major consumers of calculation resources and major generators of calculation time.

BRIEF SUMMARY OF THE INVENTION

The invention offers the crew of a vehicle—and, in particular, its driver or pilot—an easy way to view the ground and nearby artificial obstacles, while limiting the use of onboard calculation resources and reducing the calculation time. The vehicle in question may be a rotary-wing aircraft.

The invention relates to a procedure for the detection and display of the ground and of obstacles through the use of detection means installed on board a vehicle. The said detection means send measurement signals into the environment of the vehicle and, in particular, toward the ground, and receive a plurality of elementary plots Pe that are expressed in the form of three-dimensional coordinates. These elementary plots Pe correspond to the returns from these measurement signals following their contact with the ground or with an artificial obstacle of any type, such as a building, a pylon, or even an electrical power line.

These artificial obstacles are also referred to as "non-ground obstacles," because they are distinct and separate from the ground per se.

Thus, these elementary plots Pe represent at least part of the environment of the vehicle, and are capable of forming an image of that environment.

This procedure for the detection and display of the ground and of obstacles includes several stages:

A first stage consisting of the creation of a two-dimensional grid of the ground along a horizontal plane, using ground cells Ms(i,j), with each ground cell Ms(i,j) consisting of an elementary plot Pe having an altitude $Z_{Pe}$, with the said elementary plot Pe consisting of the elementary plot Pe corresponding to the said ground cell Ms(i,j) whose altitude $Z_{Pe}$ is a minimum altitude Zmin(i,j);

A second stage consisting of the creation of a network of obstacle plots $Po_n(i,j)$, with each elementary plot Pe corresponding to a given ground cell Ms(i,j) and having an altitude $Z_{Pe}$ greater than the minimum altitude Zmin(i,j) of the said ground cell Ms(i,j) forming an obstacle plot $Po_n(i,j)$;

A third stage consisting of the storage in memory of the said ground cells Ms(i,j), with each ground cell Ms(i,j) being stored in memory with the said minimum altitude Zmin(i,j);

A fourth stage consisting of the storage in memory of the said obstacle plots $Po_n(i,j)$, with each obstacle plot $Po_n(i,j)$ being stored in memory with an altitude $Z_n(i,j)$ equal to its altitude $Z_{Pe}$;

A fifth stage consisting of a comparison of each ground cell Ms(i,j) against each newly received elementary plot Pe having an altitude $Z_{Pe}$ and corresponding to this ground cell Ms(i,j), such that:

If any minimum altitude Zmin(i,j) is not stored in memory for this ground cell Ms(i,j), then the altitude $Z_{Pe}$ of this newly received elementary plot Pe is stored in memory for this ground cell Ms(i,j) as the minimum altitude Zmin(i,j);

If the altitude $Z_{Pe}$ of this newly received elementary plot Pe is greater than the minimum altitude Zmin(i,j) of this ground cell Ms(i,j), then the newly received elementary plot Pe is stored in memory as an obstacle plot $Po_n(i,j)$, with the altitude $Z_{Pe}$ of this newly received elementary plot Pe being the altitude $Z_n(i,j)$ that is associated with this obstacle plot $Po_n(i,j)$, and with the minimum altitude Zmin(i,j) of this ground cell Ms(i,j) remaining unchanged;

If the altitude $Z_{Pe}$ of this newly received elementary plot Pe is less than the minimum altitude Zmin(i,j) of this ground cell Ms(i,j), then an obstacle plot $Po_n(i,j)$ is stored in memory with an altitude $Z_n(i,j)$ that is equal to this minimum altitude Zmin(i,j) of this ground cell Ms(i,j), and the altitude $Z_{Pe}$ of this newly received elementary plot Pe is stored in memory as the new minimum altitude Zmin(i,j) of this ground cell Ms(i,j); and If the altitude $Z_{Pe}$ of this newly received elementary plot Pe is equal to the minimum altitude Zmin(i,j) of this ground cell Ms(i,j), then this newly received elementary plot Pe is ignored; and A sixth stage consisting of the display of the ground cells Ms(i,j) and/or of the obstacle plots $Po_n(i,j)$.

The detection means that are present in the vehicle and that are necessary for the implementation of the procedure according to the invention send measurement signals into the environment of the vehicle, doing so preferably into a zone in front of the vehicle and in its direction of forward progress. In particular, these measurement signals are directed toward the ground and toward the non-ground obstacles. Thus, the said detection means receive a plurality of elementary plots Pe corresponding to returns from these measurement signals after their contact with the ground and/or with a non-ground obstacle. These elementary plots Pe can then form an image of this environment.

In particular, these elementary plots Pe represent the ground. Indeed, a priori, the elementary plots Pe whose altitudes $Z_{Pe}$ are the lowest constitute the ground. In order to limit the use of calculation resources and to reduce the calculation time, the procedure according to the invention represents the ground as a horizontal plane—that is, in only two dimensions.

This horizontal plane is broken down into ground cells, thereby making it possible to create a grid of the ground. Each ground cell Ms(i,j) is characterized by an abscissa (i) and an ordinate (j) in the horizontal plane.

Each ground cell Ms(i,j) also includes a single elementary plot Pe that characterizes the altitude of the ground above the surface of this ground cell Ms(i,j). This elementary plot Pe is the elementary plot among the set of elementary plots corresponding to this ground cell Ms(i,j) whose altitude $Z_{Pe}$ is the lowest. Thus, this altitude $Z_{Pe}$ is the minimum altitude Zmin(i,j), and characterizes the ground cell Ms(i,j).

The shape of each ground cell Ms(i,j) is preferably a square. For example, each side of this square corresponds to 10 meters (10 m) on the ground.

Furthermore, the dimensions of this square may also vary depending on the position of the vehicle with respect to the ground, and, more particularly, its height above the ground. Indeed, when the vehicle is at a significant height above the ground, there is no need for a specific ground cell Ms(i,j) (that is, a ground cell that corresponds to a small surface area on the ground). Conversely, when the vehicle approaches the ground, the dimensions of the ground cell Ms(i,j) may be reduced, so as to reduce the surface area on the ground corresponding to this ground cell Ms(i,j), thereby increasing the accuracy of this ground cell Ms(i,j) and, consequently, the accuracy of the presentation of the ground and of the non-ground obstacles. Moreover, the risk of the presence of non-ground obstacles also increases when the vehicle approaches the ground. In fact, the dimensions of a ground cell Ms(i,j) may decrease dynamically as the height of the vehicle with respect to the ground decreases.

Similarly, the dimensions of the ground cells Ms(i,j) that are located far in front of the vehicle may be larger than those of the nearby ground cells Ms(i,j). Accordingly, the dimensions of a ground cell Ms(i,j) may decrease dynamically as the vehicle approaches the ground.

Advantageously, the use of ground cells Ms(i,j) whose dimensions vary dynamically makes it possible to optimize the calculation resources and the calculation time. Thus, these calculation resources can be used when they are actually necessary—that is, for the ground cells Ms(i,j) that are located near the vehicle.

Furthermore, the elementary plots Pe are also representative of the non-ground obstacles located near or on the path of the vehicle. Indeed, each ground cell Ms(i,j) has an associated single elementary plot Pe that has a minimum altitude Zmin(i,j). The other elementary plots Pe whose location places them in this same ground cell Ms(i,j) have an altitude $Z_{Pe}$ that is greater than the minimum altitude Zmin(i,j). These other elementary plots Pe probably correspond to non-ground obstacles, and therefore form obstacle plots $Po_n(i,j)$ that are associated with this ground cell Ms(i,j) and that are characterized by their respective altitudes $Z_n(i,j)$, with each altitude $Z_n(i,j)$ being equal to the altitude $Z_{Pe}$ of the corresponding elementary plot Pe.

However, if an elementary plot Pe has an altitude $Z_{Pe}$ that is equal to the minimum altitude Zmin(i,j) characterizing this ground cell Ms(i,j), then this elementary plot Pe is ignored, because it corresponds to the ground, which has already been characterized by this ground cell Ms(i,j).

Next, each ground cell Ms(i,j) is stored in memory along with the minimum altitude Zmin(i,j) that characterizes it. Similarly, each obstacle plot $Po_n(i,j)$ is stored in memory along with the altitude $Z_n(i,j)$ that characterizes it. The ground cells Ms(i,j) and the obstacle plots $Po_n(i,j)$ may be stored in memory either simultaneously or sequentially. Moreover, the ground cells Ms(i,j) and the obstacle plots $Po_n(i,j)$ may be stored in shared memory storage means or in separate memory storage means.

The detection means send measurement signals and receive elementary plots Pe at time intervals that are preferably regular in order to analyze the environment of the vehicle. In fact, the detection means regularly receive new elementary plots Pe corresponding to a new scan of the environment by the detection means.

The procedure for the detection and display of the ground and of obstacles according to the invention then makes it possible to take into consideration each newly received elementary plot Pe and to compare it against the ground cell Ms(i,j) to which it corresponds. In particular, the procedure according to the invention compares the altitude $Z_{Pe}$ of each newly received elementary plot Pe against the minimum altitude Zmin(i,j) of the corresponding ground cell Ms(i,j).

If no minimum altitude Zmin(i,j) was stored in memory beforehand for this ground cell Ms(i,j), then this newly received elementary plot Pe is the first elementary plot Pe corresponding to this ground cell Ms(i,j). This newly received elementary plot Pe is then deemed to constitute the ground. The altitude $Z_{Pe}$ of this newly received elementary plot Pe is then stored in memory for this ground cell Ms(i,j) as the minimum altitude Zmin(i,j).

If this newly received elementary plot Pe has an altitude $Z_{Pe}$ that is greater than the minimum altitude Zmin(i,j) of this ground cell Ms(i,j), then this newly received elementary plot Pe probably corresponds to an obstacle other than the ground. The newly received elementary plot Pe is then stored in memory as an obstacle plot $Po_n(i,j)$, with which the altitude $Z_n(i,j)$ that is equal to the altitude $Z_{Pe}$ of this newly received elementary plot Pe is associated. The minimum altitude Zmin(i,j) of this ground cell Ms(i,j) remains unchanged.

If this newly received elementary plot Pe has an altitude $Z_{Pe}$ that is less than the minimum altitude Zmin(i,j) of this ground cell Ms(i,j), then this newly received elementary plot Pe probably corresponds to the ground, with the elementary plot Pe that was previously used to constitute the ground cell Ms(i,j) actually being a non-ground obstacle. In fact, an obstacle plot $Po_n(i,j)$ corresponding to this non-ground obstacle is stored in memory with an altitude $Z_n(i,j)$ that is equal to the minimum altitude Zmin(i,j) that was previously associated with this ground cell Ms(i,j). The altitude $Z_{Pe}$ of this newly received elementary plot Pe is then stored in memory as the new minimum altitude Zmin(i,j). for this ground cell Ms(i,j).

Last, if the altitude $Z_{Pe}$ of this newly received elementary plot Pe is equal to the minimum altitude Zmin(i,j) of this ground cell Ms(i,j), then this newly received elementary plot Pe is ignored.

Thus, each new elementary plot Pe is input into each memory storage means as the plot is received. In fact, the result consists of a grid of the ground in the form of a two-dimensional plane, characterized by the ground cells Ms(i,j), along with a network of the obstacle plots $Po_n(i,j)$.

Accordingly, the ground cells Ms(i,j) and/or the obstacle plots $Po_n(i,j)$ can be presented to the crew of the vehicle in a simple way, through the use of display means—that is, in the form of a grid that represents the ground and a network of obstacle plots $Po_n(i,j)$, respectively. This crew is then responsible for analyzing and interpreting this network of obstacle plots $Po_n(i,j)$ in order to identify the non-ground obstacles to which they correspond, which may consist, for example, of pylons or of linear obstacles such as electrical power lines.

Depending on external visibility, the crew may also make use of what can actually be seen in the vehicle's environment, in addition to what can be seen on the display means, in order to recognize the shape of these obstacles.

The obstacle plots $Po_n(i,j)$ are advantageously displayed with no other processing steps beyond the ones described hereinabove, and particularly without image processing or shape recognition. The procedure for the detection and display of the ground and of obstacles according to the invention then makes it possible to display the obstacle plots $Po_n(i,j)$ in real time, while limiting the use of the vehicle's calculation resources and the amount of calculation time.

The display means may consist of a screen that displays, in two dimensions and in perspective, the grid representing the ground and the network of obstacle plots $Po_n(i,j)$, or a screen that displays these elements in three dimensions. The display means may also consist of a head-level display or a head-up display. Moreover, in order to make them easier for the vehicle crew to see, the obstacle plots $Po_n(i,j)$ may be displayed in the form of colored points (for example, amber-colored points).

According to two variants of the procedure according to the invention, display conditions are added to the obstacle plots $Po_n(i,j)$, depending on their altitude $Z_n(i,j)$, in order to enable or disable their presentation on the display means.

Indeed, an obstacle plot $Po_n(i,j)$ located at very low altitude may be the result of an echo of the measurement signals and/or the result of an elementary plot that does not actually correspond to a non-ground obstacle. Moreover, a vehicle—including a rotary-wing aircraft—does not operate so close to the ground unless it is in the landing phase. Furthermore, during a landing phase the pilot performs this landing visually, and does not rely solely on the information provided to him by the display means. In fact, the obstacle plots $Po_n(i,j)$ that are located at very low altitude may not be presented to the vehicle crew on the display means.

Thus, according to a first variant of the procedure according to the invention, each obstacle plot $Po_n(i,j)$ that has a difference in altitude between the altitude $Z_n(i,j)$ of this obstacle plot $Po_n(i,j)$ and the minimum altitude Zmin(i,j) of the ground cell Ms(i,j) corresponding to this obstacle plot $Po_n(i,j)$ that is less than a first threshold is ignored during the sixth stage, which consists of the display, and therefore is not presented on the display means. The first threshold may, for example, be equal to 30 feet (30 ft).

Similarly, an obstacle plot $Po_n(i,j)$ located at high altitude is not created by a non-ground obstacle, because such obstacles are not located at such altitudes. Instead, such a plot is more likely to have been generated by a cloud that sends back the measurement signals emitted by the detection means, thereby generating one or more elementary plots Pe. In fact, the obstacle plots $Po_n(i,j)$ that are located at high altitude may not be presented to the vehicle crew on the display means.

Thus, according to a second variant of the procedure according to the invention, each obstacle plot $Po_n(i,j)$ that has a difference in altitude between the altitude $Z_n(i,j)$ of this obstacle plot $Po_n(i,j)$ and the minimum altitude Zmin(i,j) of the ground cell Ms(i,j) corresponding to this obstacle plot $Po_n(i,j)$ that is greater than a second threshold is ignored during the sixth stage, which consists of the display, and therefore is not presented on the display means. The second threshold may, for example, be equal to 500 feet (500 ft).

Furthermore, the grid that represents the ground may consist of the ground cells Ms(i,j), taking into consideration the minimum altitude Zmin(i,j) associated with each ground cell Ms(i,j). Thus, the set of ground cells Ms(i,j) forms a three-dimensional grid representing the ground.

Furthermore, each ground cell Ms(i,j) may be formed initially with the aid of a digital terrain model ["modèle numérique de terrain"] MNT, and the initial minimum altitude Zmin(i,j) of this ground cell Ms(i,j) is the altitude of the digital terrain model MNT.

A digital terrain model MNT may consist, for example, of a model designated by the DTED, which is the English abbreviation of "Digital Terrain Elevation Data". Such a DTED model provides the maximum terrain elevations, marked on relatively large geographic grids.

Furthermore, the three-dimensional coordinates of the elementary plots Pe are all known beforehand, following their reception by the detection means installed in the vehicle, in a coordinate system that is linked to the detection means, and thus in a coordinate system that is linked to the vehicle. The procedure for the detection and display of the ground and of obstacles according to the invention may use these coordinates of the elementary plots Pe in a coordinate system that is linked to the vehicle.

However, the creation of the ground cells by the procedure according to the invention preferably takes place in a local ground-based geographic coordinate system (that is, a coordinate system that is fixed with respect to the terrestrial globe). Next, these coordinates of the elementary plots Pe must be converted in order to be provided in this ground-based geographic coordinate system. Thus, each elementary plot Pe, each ground cell Ms(i,j), and each obstacle plot $Po_n(i,j)$ is fixed in such a ground-based geographic coordinate system. In this case, a preliminary stage consisting of the conversion of the coordinates of the elementary plots Pe takes place prior to the first stage.

For example, in a coordinate system that is linked to the vehicle, the coordinates of an elementary plot Pe are established in the form of spherical coordinates depending on the site, the field, and the distance, whereas in a geographic coordinate system, these coordinates are the latitude, longitude, and the altitude of this elementary plot Pe. Such a conversion of the coordinates of an elementary plot Pe from a coordinate system linked to the vehicle to a ground-based geographic coordinate system is known and is described, for example, in document FR 2953316.

The invention also relates to a program containing code stored on a medium or embodied in a signal, which code can be read or executed by a data-processing unit intended to be installed on board a vehicle in order to process a plurality of elementary plots Pe that are received by detection means. This code includes code segments for the implementation of the various stages of the procedure for the detection and display of the ground and of obstacles as described hereinabove.

Last, the invention relates to a device for the detection and display of the ground and of obstacles for the implementation of the procedure for the detection and display of the ground and of obstacles as described hereinabove. This device, intended to be installed on board a vehicle, includes detection means that send measurement signals into the environment of the vehicle and that receive a plurality of elementary plots Pe; a reference and course heading system; and a location system, as well as a processing unit; one or more memory storage means; and display means.

Thus, this device for the detection and display of the ground and of obstacles is capable of implementing the procedure for the detection and display of the ground and of obstacles as described hereinabove.

In particular, thanks to the information provided by the reference and course heading system, as well as by the location system, the processing unit makes it possible to convert the three-dimensional coordinates of the elementary plots Pe from a coordinate system that is linked to the vehicle to a ground-based geographic coordinate system.

The processing unit is also linked to each memory storage means in which the ground cells Ms(i,j) with the minimum altitudes Zmin(i,j) and the obstacle plots $Po_n(i,j)$ with their respective altitudes $Z_n(i,j)$ are stored.

BRIEF DESCRIPTION OF THE SEVERAL VIEWS OF THE DRAWINGS

The invention and its advantages will become clear in greater detail within the scope of the following description, which includes illustrative examples with reference to the attached figures, among which.

DETAILED DESCRIPTION OF THE INVENTION

Elements that appear in two or more different figures are indicated by the same reference number.

Figure 1:
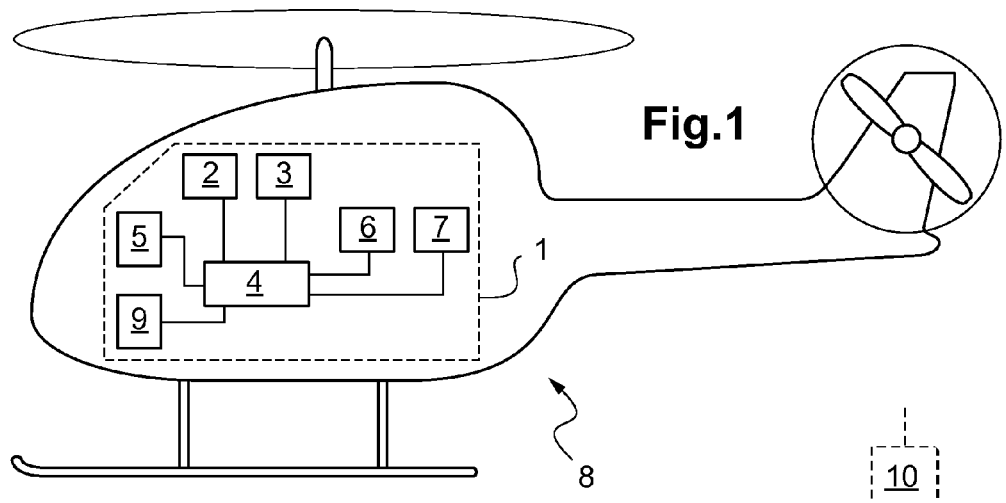
FIG. 1 is a rotary-wing aircraft equipped with a device for the detection and display of the ground and of obstacles.

FIG. 1 shows a rotary-wing aircraft (8) equipped with a device (1) for the detection and display of the ground and of obstacles. This device (1) for the detection and display of the ground and of obstacles includes detection means (9); a reference and course heading system (2); and a location system (3), as well as a processing unit (4); first and second memory storage means (6, 7); and display means (5).

Figure 2:
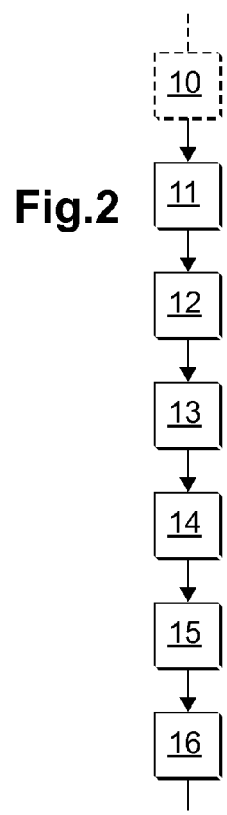
FIG. 2 is a schematic block diagram of a procedure for the detection and display of the ground and of obstacles.

FIG. 2 is a schematic block diagram of a procedure for the detection and display of the ground and of obstacles. This procedure includes multiple stages, and may be implemented by the device (1) in order to detect and then to display the ground and the artificial obstacles other than the ground located in the environment of the aircraft (8).

The detection means (9) send measurement signals into the environment of the aircraft (8), doing so preferably into a zone in front of the aircraft (8) and in its direction of forward progress. In particular, these measurement signals are directed toward the ground and toward the non-ground obstacles. These detection means receive a plurality of elementary plots Pe corresponding to returns from these measurement signals after their contact with the ground and/or with a non-ground obstacle. Thus, these elementary plots Pe are capable of characterizing the environment of the aircraft (8).

The detection means may consist of a LIDAR or RADAR scanner, or a stereoscopic or three-dimensional imaging system.

Furthermore, the elementary plots Pe that are received by the detection means (9) are defined by three-dimensional coordinates in a coordinate system that is linked to these detection means and to the aircraft (8). The procedure for the detection and display of the ground and of obstacles may use these coordinates of the elementary plots Pe in such a coordinate system that is linked to the aircraft (8).

However, the procedure for the detection and display of the ground and of obstacles may also include a preliminary stage (10) consisting of the conversion of these coordinates of the elementary plots Pe from a coordinate system linked to the aircraft (8) to a ground-based geographic coordinate system.

During this preliminary stage (10), the processing unit (4), which, in particular, is linked to the detection means (9), to the location system (3), and to the reference and course heading system (2), uses operational information, as well as information about the location of the aircraft (8), in a ground-based geographic coordinate system in order to perform this conversion of these coordinates of the elementary plots Pe. The phrase "operational information" refers, in particular, to the speeds and the course heading of the aircraft (8).

Figure 3:
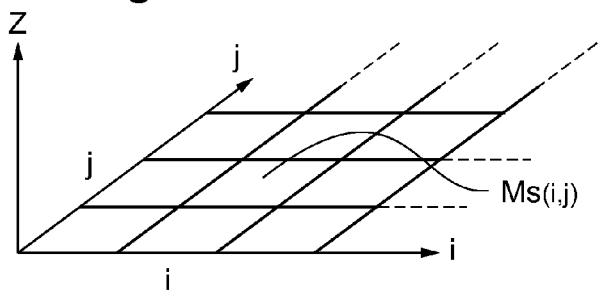
FIGS. 3 and 4 are two representations of the horizontal plane representing the ground, with and without non-ground obstacles.

Next, during a first stage (11), consisting of the creation of the ground cells in two dimensions, individual ground cells Ms(i,j) are determined. These ground cells Ms(i,j) make it possible to create a grid of the ground and to form a horizontal plane. Such a horizontal plane consisting of ground cells Ms(i,j) is shown in FIG. 3, in which each ground cell Ms(i,j) is characterized by an abscissa (i) and an ordinate (j) in the horizontal plane.

Each ground cell Ms(i,j) covers part of the surface area of the ground, and is preferably in the form of a square. Each ground cell Ms(i,j) may have fixed the dimensions. For example, each ground cell Ms(i,j) may consist of a square whose sides correspond to 10 meters (10 m) on the ground.

Each ground cell Ms(i,j) may also have dimensions that vary depending on the position of the aircraft (8) with respect to the ground. For example, the dimensions of each ground cell Ms(i,j) may decrease as the aircraft approaches the ground cell Ms(i,j). Thus, the accuracy of a ground cell Ms(i,j) and, consequently, the accuracy of the presentation of the ground and of the non-ground obstacles increases when the aircraft (8) approaches the ground cell Ms(i,j).

Each ground cell Ms(i,j) consists of a single elementary plot Pe that has an altitude $Z_{Pe}$. This elementary plot Pe is the elementary plot Pe that corresponds to this ground cell Ms(i,j) whose altitude $Z_{Pe}$ is the lowest. Indeed, a priori, the elementary plots Pe whose altitudes $Z_{Pe}$ are the lowest constitute the ground for the surface of the ground represented by this ground cell Ms(i,j). Consequently, the minimum altitude Zmin(i,j) associated with this ground cell Ms(i,j) is the altitude $Z_{Pe}$ of this elementary plot Pe.

Thus, because each ground cell Ms(i,j) is associated with a minimum altitude Zmin(i,j), the set of ground cells Ms(i,j) accurately characterizes the ground, taking into consideration an altitude of the ground for each ground cell Ms(i,j), even though these ground cells Ms(i,j) form a horizontal (that is, two-dimensional) plane.

Next, during the second stage (12) consisting of the creation of a network of obstacle plots $Po_n(i,j)$, obstacle plots $Po_n(i,j)$ are determined on the basis of the elementary plots Pe that do not characterize a ground cell Ms(i,j). Indeed, each elementary plot Pe that is located in a given ground cell Ms(i,j) and whose altitude $Z_{Pe}$ is greater than the minimum altitude Zmin(i,j) of that ground cell Ms(i,j) probably represents an obstacle other than the ground.

Accordingly, each elementary plot Pe whose altitude $Z_{Pe}$ is greater than the minimum altitude Zmin(i,j) of the ground cell Ms(i,j) to which it corresponds constitutes an obstacle plot $Po_n(i,j)$ that is associated with the ground cell Ms(i,j) and that is characterized by an altitude $Z_n(i,j)$. This altitude $Z_n(i,j)$ is equal to the altitude $Z_{Pe}$ of this elementary plot Pe.

Accordingly, the obstacle plots $Po_n(i,j)$ can be characterized by an altitude $Z_n(i,j)$ that is associated with a ground cell Ms(i,j), and by their three-dimensional coordinates in the ground-based geographic coordinate system.

Conversely, during this second stage (12), if an elementary plot Pe has an altitude $Z_{Pe}$ that is equal to the minimum altitude Zmin(i,j) that characterizes this ground cell Ms(i,j), then this elementary plot Pe is ignored.

Figure 4:
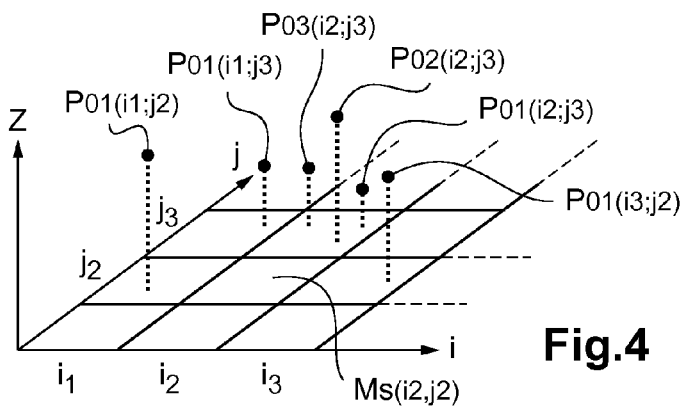

FIG. 4 shows, on the one hand, a horizontal plane consisting of ground cells Ms(i,j), and, on the other hand, several obstacle plots $Po_n(i,j)$. For example, it can be seen that a single obstacle plot $Po_1(i_1,j_2)$ is associated with the ground cell Ms($i_1,j_2$), and likewise for the ground cells Ms($i_1,j_3$) and Ms($i_3,j_2$). Conversely, three obstacle plots $Po_1(i_2,j_3)$, $Po_2(i_2,j_3)$, and $Po_3(i_2,j_3)$ are associated with the ground cell Ms($i_2,j_3$).

During a third stage (13) consisting of the storage in memory of the ground cells Ms(i,j), each ground cell Ms(i,j) is stored, along with the minimum altitude Zmin(i,j), in the first memory storage means (6).

During a fourth stage (14) consisting of the storage in memory of the obstacle plots $Po_n(i,j)$, each obstacle plot $Po_n(i,j)$ is stored, along with an altitude $Z_n(i,j)$, in the second memory storage means (7).

These third and fourth stages (13,14) may be simultaneous or sequential. Moreover, the first memory storage means (6) and the second memory storage means (7) may form single shared memory storage means, in which case the ground cells Ms(i,j) and the obstacle plots $Po_n(i,j)$ are stored in these shared memory storage means.

Next, during a fifth stage (15) consisting of a comparison, each ground cell Ms(i,j) is compared against each newly received elementary plot Pe having an altitude $Z_{Pe}$ and corresponding to this ground cell Ms(i,j), in order to determine whether this newly received elementary plot Pe might potentially constitute a non-ground obstacle or whether it actually corresponds to the ground itself.

Indeed, the detection means (9) send measurement signals and, in return, receive elementary plots Pe at time intervals that are preferably regular. In fact, the detection means (9) regularly receive new elementary plots Pe corresponding to a new scan of the environment of the aircraft (8).

More specifically, during this fifth stage (15) consisting of a comparison, the minimum altitude Zmin(i,j) of each ground cell Ms(i,j) is compared against the altitude $Z_{Pe}$ of each newly received elementary plot Pe corresponding to the ground cell Ms(i,j).

If no minimum altitude Zmin(i,j) was stored in memory beforehand for this ground cell Ms(i,j), then this newly received elementary plot Pe is the first elementary plot Pe corresponding to this ground cell Ms(i,j), and it is deemed to correspond to the ground. The altitude $Z_{Pe}$ of this newly received elementary plot Pe is then stored in memory for this ground cell Ms(i,j) as the minimum altitude Zmin(i,j).

If this newly received elementary plot Pe has an altitude $Z_{Pe}$ that is greater than the minimum altitude Zmin(i,j) of this ground cell Ms(i,j), then this newly received elementary plot Pe probably corresponds to an obstacle other than the ground. The newly received elementary plot Pe is then stored in memory as an obstacle plot $Po_n(i,j)$, with which the altitude $Z_n(i,j)$ that is equal to the altitude $Z_{Pe}$ of this newly received elementary plot Pe is associated. The minimum altitude Zmin(i,j) of this ground cell Ms(i,j) remains unchanged.

If this newly received elementary plot Pe has an altitude $Z_{Pe}$ that is less than the minimum altitude Zmin(i,j) of this ground cell Ms(i,j), then this newly received elementary plot Pe probably corresponds to the ground, with the elementary plot Pe that was previously used to constitute the ground cell Ms(i,j) actually being a non-ground obstacle. In fact, an obstacle plot $Po_n(i,j)$ corresponding to this non-ground obstacle is stored in memory with an altitude $Z_n(i,j)$ that is equal to the minimum altitude Zmin(i,j) that was previously associated with this ground cell Ms(i,j). The altitude $Z_{Pe}$ of this newly received elementary plot Pe is then stored in memory as the new minimum altitude Zmin(i,j). for this ground cell Ms(i,j).

If the altitude $Z_{Pe}$ of this newly received elementary plot Pe is equal to the minimum altitude Zmin(i,j) of this ground cell Ms(i,j), then this newly received elementary plot Pe is ignored.

Thus, the new elementary plots Pe that are received are input, in accordance with their altitudes $Z_{Pe}$, into each memory storage means (6, 7) as the plots are received. In fact, the result consists of a grid of the ground in the form of a two-dimensional plane, characterized by the ground cells Ms(i,j), along with a network of the obstacle plots $Po_n(i,j)$.

Last, during a sixth stage (16) consisting of a display, the ground cells Ms(i,j) and/or the obstacle plots $Po_n(i,j)$ are displayed on the display means (5), thereby presenting the potential non-ground obstacles in a simple way to the crew of the aircraft (8).

Accordingly, the crew of the aircraft can then analyze and interpret this network of obstacle plots $Po_n(i,j)$ in order to identify the non-ground obstacles, such as pylons or electrical power lines, that may be present in the environment of the aircraft (8).

An obstacle plot $Po_n(i,j)$ associated with a ground cell Ms(i,j) is then displayed, based on their altitude $Z_n(i,j)$. However, because the dimensions of a ground cell Ms(i,j) may be large, the obstacle plots $Po_n(i,j)$ may be displayed on the basis of their three-dimensional coordinates in the ground-based geographic coordinate system. This display of the obstacle plots $Po_n(i,j)$ on the basis of their three-dimensional coordinates also makes it possible to differentiate multiple obstacle plots $Po_n(i,j)$ associated with a single ground cell Ms(i,j), as is the case for plots $Po_1$, $Po_2$, and $Po_3$, which are associated with the ground cell $Ms(i_2,j_3)$.

The display means (5) may consist of a screen that displays, in two dimensions and in perspective, the horizontal plane representing the ground and the network of obstacle plots $Po_n(i,j)$. These display means (5) may also consist of a screen that displays these elements in three dimensions, or else a head-level or head-up display.

According to two variants of the procedure for the detection and display of the ground and of obstacles, display conditions are added to the obstacle plots $Po_n(i,j)$, depending on their respective altitudes $Z_n(i,j)$, in order to allow or prohibit their presentation on the display means (5).

Thus, according to a first variant of this procedure, each obstacle plot $Po_n(i,j)$ that has a difference in altitude between the altitude $Z_n(i,j)$ of this obstacle plot $Po_n(i,j)$ and the minimum altitude Zmin(i,j) of the ground cell Ms(i,j) corresponding to this obstacle plot $Po_n(i,j)$ that is less than a first threshold is ignored during the sixth stage (16) consisting of the display, and therefore is not presented on the display means (5). The first threshold may, for example, be equal to 30 feet (30 ft).

Similarly, according to a second variant of this procedure, each obstacle plot $Po_n(i,j)$ that has a difference in altitude between the altitude $Z_n(i,j)$ of this obstacle plot $Po_n(i,j)$ and the minimum altitude Zmin(i,j) of the ground cell Ms(i,j) corresponding to this obstacle plot $Po_n(i,j)$ that is greater than a second threshold is ignored during the sixth stage (16) consisting of the display, and therefore is not presented on the display means (5). The second threshold may, for example, be equal to 500 feet (500 ft).

Furthermore, each ground cell Ms(i,j) may form a digital terrain model MNT, and the initial minimum altitude Zmin (i,j) of this ground cell Ms(i,j) is the altitude of the digital terrain model MNT.

The obstacle plots $Po_n(i,j)$ are advantageously displayed simply on the display means (5), and particularly without image processing or shape recognition. The procedure for the detection and display of the ground and of obstacles according to the invention then makes it possible to display obstacle plots $Po_n(i,j)$ in real time, while limiting the use of the calculation resources of the processing unit (4).

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A procedure for the detection and display of the ground and of obstacles, the procedure comprising:
   sending measurement signals from detection means installed on board a vehicle into an environment of the vehicle;
   receiving by the detection means a plurality of elementary plots (Pe) expressed in the form of three-dimensional coordinates, the elementary plots (Pe) corresponding to returns from the measurement signals following their contact with the ground or with obstacles in the environment of the vehicle such that the elementary plots (Pe) represent at least part of the environment of the vehicle;
   creating by a processor a two-dimensional grid of the ground along a horizontal plane using ground cells (Ms (i,j)), with each ground cell (Ms(i,j)) consisting of an elementary plot (Pe) having an altitude ($Z_{Pe}$), with the elementary plot (Pe) consisting of the elementary plot (Pe) corresponding to the ground cell (Ms(i,j)) whose altitude ($Z_{Pe}$) is a minimum altitude (Zmin(i,j));
   creating by the processor a network of obstacle plots ($Po_n$ (i,j)), with each elementary plot (Pe) corresponding to a ground cell (Ms(i,j)) and having an altitude ($Z_{Pe}$) greater than the minimum altitude (Zmin(i,j)) of the ground cell (Ms(i,j)) forming an obstacle plot ($Po_n(i,j)$);
   storing by the processor in a memory the ground cells (Ms(i,j)), with each ground cell (Ms(i,j)) being stored in the memory with the minimum altitude (Zmin(i,j));
   storing by the processor in the memory the obstacle plots ($Po_n(i,j)$), with each obstacle plot ($Po_n(i,j)$) being stored in the memory with an altitude ($Z_n(i,j)$) equal to the altitude ($Z_{Pe}$);
   comparing by the processor each ground cell (Ms(i,j)) against each newly received elementary plot (Pe) having an altitude ($Z_{Pe}$) and corresponding to the ground cell (Ms(i,j)), such that:
   when any minimum altitude (Zmin(i,j)) is not stored in the memory for the ground cell (Ms(i,j)), storing by the processor in the memory the altitude ($Z_{Pe}$) of the newly received elementary plot (Pe) for the ground cell (Ms(i,j)) as the minimum altitude (Zmin(i,j));
   when the altitude ($Z_{Pe}$) of the newly received elementary plot (Pe) is greater than the minimum altitude (Zmin (i,j)) of the ground cell (Ms(i,j)), storing by the processor in the memory the newly received elementary plot (Pe) as an obstacle plot ($Po_n(i,j)$) having an altitude ($Z_n(i,j)$) that is equal to the altitude ($Z_{Pe}$) of the newly received elementary plot (Pe) with the minimum altitude (Zmin(i,j)) of the ground cell (Ms(i,j)) remaining unchanged;

when the altitude ($Z_{Pe}$) of the newly received elementary plot (Pe) is less than the minimum altitude (Zmin(i,j)) of the ground cell (Ms(i,j)), storing by the processor in the memory an obstacle plot ($Po_n(i,j)$) with an altitude ($Z_n(i,j)$) that is equal to the minimum altitude (Zmin(i,j)) and storing in the memory the altitude ($Z_{Pe}$) of the newly received elementary plot (Pe) as the new minimum altitude (Zmin(i,j)) of the ground cell (Ms(i,j));

when the altitude ($Z_{Pe}$) of the newly received elementary plot (Pe) is equal to the minimum altitude (Zmin(i,j)) of the ground cell (Ms(i,j)), ignoring by the processor the newly received elementary plot (Pe); and displaying the obstacle plots (Pon(i,j)) on a display.

2. The procedure according to claim 1, wherein each obstacle plot ($Po_n(i,j)$) having a difference in altitude between the altitude ($Z_n(i,j)$) and the minimum altitude (Zmin(i,j)) of the ground cell (Ms(i,j)) corresponding to the obstacle plot ($Po_n(i,j)$) that is less than a first threshold is ignored during the step of displaying the obstacle plots (Pon(i,j)).

3. The procedure according to claim 1, wherein each obstacle plot ($Po_n(i,j)$) having a difference in altitude between the altitude ($Z_n(i,j)$) and the minimum altitude (Zmin(i,j)) of the ground cell (Ms(i,j)) corresponding to the obstacle plot ($Po_n(i,j)$) that is greater than a second threshold is ignored during the step of displaying the obstacle plots (Pon(i,j)).

4. The procedure according to claim 1, wherein each ground cell (Ms(i,j)) is in the form of a square whose dimensions vary depending on the position of the vehicle with respect to the ground.

5. The procedure according to claim 1, wherein each ground cell (Ms(i,j)) is in the form of a square, each of whose sides corresponds to 10 meters on the ground.

6. The procedure according to claim 2, wherein the first threshold is equal to 30 feet.

7. The procedure according to claim 3, wherein the second threshold is equal to 500 feet.

8. The procedure according to claim 1, wherein during the step of displaying the obstacle plots (Pon(i,j)) each ground cell (Ms(i,j)) is displayed taking into consideration the minimum altitude (Zmin(i,j)) associated with the ground cell (Ms(i,j)), thereby forming a three-dimensional grid representing the ground.

9. The procedure according to claim 1, further comprising converting the three-dimensional coordinates of the elementary plots (Pe) prior to creating the two-dimensional grid of the ground in order to convert the three-dimensional coordinates of the elementary plots (Pe) of a reference mark linked to the vehicle into a ground-based geographic reference mark.

10. The procedure according to claim 1, wherein each ground cell (Ms(i,j)) forms a digital terrain model (MNT), and the initial minimum altitude (Zmin(i,j)) of the ground cell (Ms(i,j)) is the altitude of the digital terrain model (MNT).

11. A system for the detection and display of the ground and of obstacles, the system comprising:

detection means to send measurement signals into an environment of a vehicle and to receive a plurality of elementary plots (Pe) expressed in the form of three-dimensional coordinates, the elementary plots (Pe) corresponding to returns from the measurement signals following their contact with the ground or with obstacles in the environment of the vehicle such that the elementary plots (Pe) represent at least part of the environment of the vehicle;

a reference and course heading system;

a location system;

a processing unit;

one or more memory storage means; and display means;

wherein the processing unit is operable with the detection means, the reference and course heading system, the location system, the memory storage means, and the display means to:

create a two-dimensional grid of the ground along a horizontal plane using ground cells (Ms(i,j)), with each ground cell (Ms(i,j)) consisting of an elementary plot (Pe) having an altitude ($Z_{Pe}$), with the elementary plot (Pe) consisting of the elementary plot (Pe) corresponding to the ground cell (Ms(i,j)) whose altitude ($Z_{Pe}$) is a minimum altitude (Zmin(i,j));

create a network of obstacle plots ($Po_n(i,j)$), with each elementary plot (Pe) corresponding to a ground cell (Ms(i,j)) and having an altitude ($Z_{Pe}$) greater than the minimum altitude (Zmin(i,j)) of the ground cell (Ms(i,j)) forming an obstacle plot ($Po_n(i,j)$);

store in the memory storage means the ground cells (Ms(i,j)), with each ground cell (Ms(i,j)) being stored in the memory storage means with the minimum altitude (Zmin(i,j));

store in the memory storage means the obstacle plots ($Po_n(i,j)$), with each obstacle plot ($Po_n(i,j)$) being stored in the memory storage means with an altitude ($Z_n(i,j)$) equal to the altitude ($Z_{Pe}$);

compare each ground cell (Ms(i,j)) against each newly received elementary plot (Pe) having an altitude ($Z_{Pe}$) and corresponding to the ground cell (Ms(i,j)), such that:

when any minimum altitude (Zmin(i,j)) is not stored in the memory storage means for the ground cell (Ms(i,j)), the altitude ($Z_{Pe}$) of the newly received elementary plot (Pe) is stored in the memory storage means for the ground cell (Ms(i,j)) as the minimum altitude (Zmin(i,j));

when the altitude ($Z_{Pe}$) of the newly received elementary plot (Pe) is greater than the minimum altitude (Zmin(i,j)) of the ground cell (Ms(i,j)), the newly received elementary plot (Pe) is stored in the memory storage means as an obstacle plot ($Po_n(i,j)$) having an altitude $Z_n(i,j)$) that is equal to the altitude ($Z_{Pe}$) of the newly received elementary plot (Pe) with the minimum altitude (Zmin(i,j)) of the ground cell (Ms(i,j)) remaining unchanged;

when the altitude ($Z_{Pe}$) of the newly received elementary plot (Pe) is less than the minimum altitude (Zmin(i,j)) of the ground cell (Ms(i,j)), an obstacle plot ($Po_n(i,j)$) is stored in the memory storage means with an altitude ($Z_n(i,j)$) that is equal to the minimum altitude (Zmin(i,j)) and the altitude ($Z_{Pe}$) of the newly received elementary plot (Pe) is stored in the memory storage means as the new minimum altitude (Zmin(i,j)) of the ground cell (Ms(i,j));

when the altitude ($Z_{Pe}$) of the newly received elementary plot (Pe) is equal to the minimum altitude (Zmin(i,j)) of the ground cell (Ms(i,j)), the newly received elementary plot (Pe) is ignored; and display the obstacle plots (Pon(i,j)) on the display means.

12. A vehicle comprising:

detection means to send measurement signals into an environment of a vehicle and to receive a plurality of elementary plots (Pe) expressed in the form of three-dimensional coordinates, the elementary plots (Pe) corresponding to returns from the measurement signals following their contact with the ground or with obstacles in the environment of the vehicle such that the elementary plots (Pe) represent at least part of the environment of the vehicle;

a processor;

a memory;

a display;

wherein the processor is configured to:

create a two-dimensional grid of the ground along a horizontal plane using ground cells (Ms(i,j)), with each ground cell (Ms(i,j)) consisting of an elementary plot (Pe) having an altitude ($Z_{Pe}$), with the elementary plot (Pe) consisting of the elementary plot (Pe) corresponding to the ground cell (Ms(i,j)) whose altitude ($Z_{Pe}$) is a minimum altitude (Zmin(i,j));

create a network of obstacle plots ($Po_n$(i,j)), with each elementary plot (Pe) corresponding to a ground cell (Ms(i,j)) and having an altitude ($Z_{Pe}$) greater than the minimum altitude (Zmin(i,j)) of the ground cell (Ms(i,j)) forming an obstacle plot ($Po_n$(i,j));

store in the memory the ground cells (Ms(i,j)), with each ground cell (Ms(i,j)) being stored in the memory with the minimum altitude (Zmin(i,j));

store in the memory the obstacle plots ($Po_n$(i,j)), with each obstacle plot ($Po_n$(i,j)) being stored in the memory with an altitude ($Z_n$(i,j)) equal to the altitude ($Z_{Pe}$);

compare each ground cell (Ms(i,j)) against each newly received elementary plot (Pe) having an altitude ($Z_{Pe}$) and corresponding to the ground cell (Ms(i,j)), such that:

when any minimum altitude (Zmin(i,j)) is not stored in the memory for the ground cell (Ms(i,j)), the altitude ($Z_{Pe}$) of the newly received elementary plot (Pe) is stored in the memory for the ground cell (Ms(i,j)) as the minimum altitude (Zmin(i,j));

when the altitude ($Z_{Pe}$) of the newly received elementary plot (Pe) is greater than the minimum altitude (Zmin(i,j)) of the ground cell (Ms(i,j)), the newly received elementary plot (Pe) is stored in the memory as an obstacle plot ($Po_n$(i,j)) having an altitude ($Z_n$(i,j)) that is equal to the altitude ($Z_{Pe}$) of the newly received elementary plot (Pe) with the minimum altitude (Zmin(i,j)) of the ground cell (Ms(i,j)) remaining unchanged;

when the altitude ($Z_{Pe}$) of the newly received elementary plot (Pe) is less than the minimum altitude (Zmin(i,j)) of the ground cell (Ms(i,j)), an obstacle plot ($Po_n$(i,j)) is stored in the memory with an altitude ($Z_n$(i,j)) that is equal to the minimum altitude (Zmin(i,j)) and the altitude ($Z_{Pe}$) of the newly received elementary plot (Pe) is stored in the memory as the new minimum altitude (Zmin(i,j)) of the ground cell (Ms(i,j));

when the altitude ($Z_{Pe}$) of the newly received elementary plot (Pe) is equal to the minimum altitude (Zmin(i,j)) of the ground cell (Ms(i,j)), the newly received elementary plot (Pe) is ignored; and display the obstacle plots (Pon(i,j)) on the display.

* * * * *